J. F. PERKINS AND E. C. WOOD.
METHOD FOR ESTABLISHING OSCILLATIONS AND MECHANISM THEREFOR.
APPLICATION FILED APR. 9, 1915.

1,317,216.

Patented Sept. 30, 1919.
8 SHEETS—SHEET 1.

J. F. PERKINS AND E. C. WOOD.
METHOD FOR ESTABLISHING OSCILLATIONS AND MECHANISM THEREFOR.
APPLICATION FILED APR. 9, 1915.

1,317,216.

Patented Sept. 30, 1919.
8 SHEETS—SHEET 2.

J. F. PERKINS AND E. C. WOOD.
METHOD FOR ESTABLISHING OSCILLATIONS AND MECHANISM THEREFOR.
APPLICATION FILED APR. 9, 1915.

1,317,216.

Patented Sept. 30, 1919.
8 SHEETS—SHEET 5.

J. F. PERKINS AND E. C. WOOD.
METHOD FOR ESTABLISHING OSCILLATIONS AND MECHANISM THEREFOR.
APPLICATION FILED APR. 9, 1915.

1,317,216.

Patented Sept. 30, 1919.
8 SHEETS—SHEET 7.

WITNESSES:

INVENTORS
John Forbes Perkins
Edward C. Wood
By Grant Hays
his attorneys.

UNITED STATES PATENT OFFICE.

JOHN FORBES PERKINS, OF MILTON, AND EDWARD C. WOOD, OF SOMERVILLE, MASSACHUSETTS, ASSIGNORS TO SUBMARINE SIGNAL COMPANY, OF PORTLAND, MAINE, A CORPORATION OF MAINE.

METHOD FOR ESTABLISHING OSCILLATIONS AND MECHANISM THEREFOR.

1,317,216.  Specification of Letters Patent.  Patented Sept. 30, 1919.

Application filed April 9, 1915. Serial No. 20,330.

*To all whom it may concern:*

Be it known that we, JOHN FORBES PERKINS, of Milton, in the county of Norfolk and State of Massachusetts, and EDWARD C. WOOD, of Somerville, in the county of Middlesex and said State, have invented a new and useful Improvement in Methods for Establishing Oscillations and Mechanism Therefor, of which the following is a specification.

Our invention relates especially to the setting up of vibrations in a vibratory body and is especially adapted for use in submarine signaling although it has other uses. Its particular purpose is the setting up of vibrations in a vibrator under conditions such that any desired rate of vibration may be secured. It consists in its preferred form in establishing a series of freely movable magnetic fields all acting upon an oscillatory conductor which has a limited movement controlled both by the magnetic fields and the vibrator, being connected to the vibrator in such a way that with each movement of the conductor in one direction the vibrator is given a pull and its consequent increasing stress gradually overcomes the force of the magnetic fields acting on the conductor and gives it a return oscillation. The vibrator may be a diaphragm, a part of the skin of the ship, a vibratory reed, a tuning fork, etc.

To describe the invention in the specific concrete form shown herein, the conductor is caused to move in one direction by the passing of magnetic fields which as they approach the conductor, give it a movement against the stress of a diaphragm or vibrator which it pulls during this movement, the vibrator yielding according to its elasticity; the vibrator, however, tends to react with increasing force and as the magnetic fields pass the conductor which is under this restraint, the pulling effect of the magnetic force acting on the conductor is gradually overcome because of its construction as below described and the conductor returns to its original position and swings beyond it when it is again acted upon in a similar manner.

Our invention will be understood by reference to the drawings in which—

In the form of our invention shown in Figs. 1 to 7, inclusive A is the base on which is mounted at one end a motor $A^1$ the shaft $a$ of which is connected by any suitable coupling $a^1$ with the shaft $A^2$. The shaft $A^2$ is supported in bearings on posts $A^3$ mounted on the table A.

The field comprises four sets of electromagnets, two outer sets and two inner sets, all mounted on hubs B, C keyed to the shaft $A^2$ to rotate therewith and forming what may be termed a rotor. The cores $B^1$, $B^2$, $C^1$, $C^2$ are preferably laminated to avoid eddy currents and radiate from the hubs B and C. The cores $B^1$, $B^2$ are separated by an air gap as are the cores $C^1$, $C^2$, and in the air gap lies the conductor D which is mounted on spokes $D^1$ carried by a sleeve $D^2$ running on ball bearings $d$ on a hub $D^3$ keyed to the shaft $A^2$ so that the conductor can be moved independently of the shaft.

Figure 3:
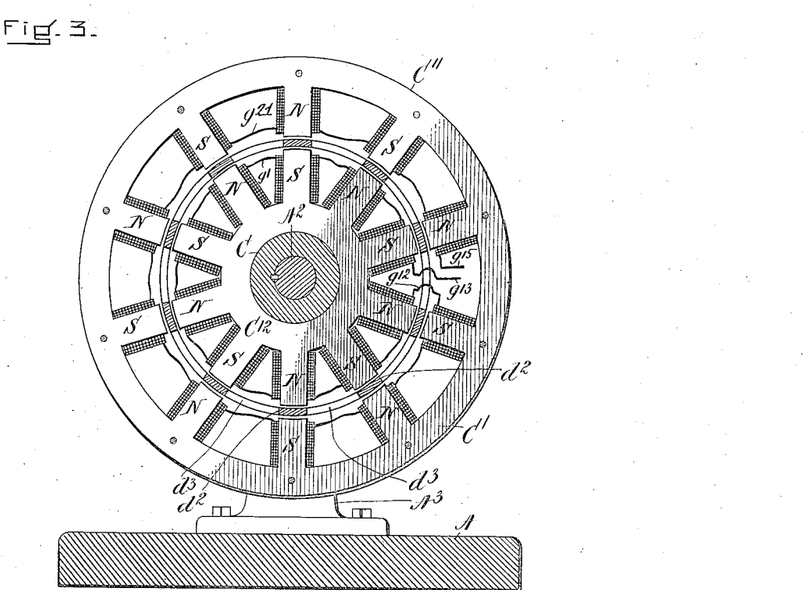
Fig. 3 is a section on the line 3—3 of Fig. 2.
Figure 4:
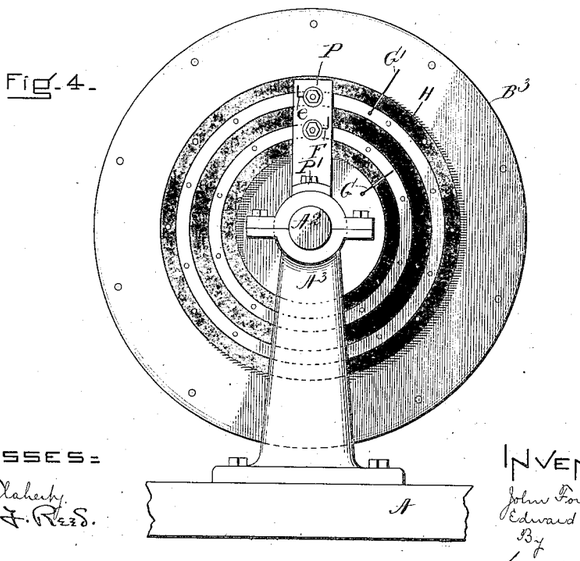
Fig. 4 is an end view of the apparatus.

The cores are preferably stamped from sheet iron, the outer sets $B^1$, $C^1$, being connected by parts $B^{11}$, $C^{11}$, and the inner sets of cores $B^2$, $C^2$ projecting from hubs $B^{12}$, $C^{12}$ (see Fig. 3). The requisite number of sheets to form the cores $B^2$, $C^2$ are affixed to the sleeves B and C, respectively. Each sleeve B, C carries a recessed flange $B^3$, $C^3$ and the parts $B^{11}$, $C^{11}$ connecting the outer sets of cores $B^1$, $C^1$ are bolted to the peripheries of the plates $B^3$, $C^3$ through clamping rings $b$, $c$.

Around each core is wound a coil E, $E^1$, $E^2$, $E^3$, the adjacent coils being so wound and connected that north and south poles will alternate around the machine, and the north poles of the outer set of electro-magnets will be opposite the south poles of the inner set, and vice versa, as will be understood from Fig. 3 where the north poles are marked N and the south poles S.

Connections are made from a source of direct current by means of the wires F, $F^1$, the wire F, for example, being the positive lead and the wire $F^1$ being the negative. The wire F connects with a brush $f$ which contacts with a ring G mounted upon an insulating plate H on the flange $B^3$ and from this ring connection is made by means of the wire $g$ with one of the inner series of coils $E^1$. Preferably the coils of this inner set are also connected in series and are connected by means of the wire $g^2$ (see Fig. 2) to one of the outer series of coils E which are all likewise connected in series. The last of the outer coils in the series is connected by the wire $g^3$ with the ring $G^1$ mounted on the insulated plate H. In contact with this ring $G^1$ is a brush $g^4$ which is connected by the wire $e$ with a corresponding brush $g^{14}$ at the other end of the instrument in contact with the ring $G^{11}$ mounted on the insulated plate $H^1$. The wire $g^{15}$ connects the ring $G^{11}$ with the outer series of coils $E^2$. As on the other side of the apparatus, the circuit is continued through the coils in series, first the outer set of coils in this case and then by wire $g^{12}$ through the inner set $E^3$ which are also in series, and by wire $g^{13}$ to the ring $G^{10}$ and by brush $g^{10}$ to the wire $F^2$ and thence to the circuit closer.

Figure 5:
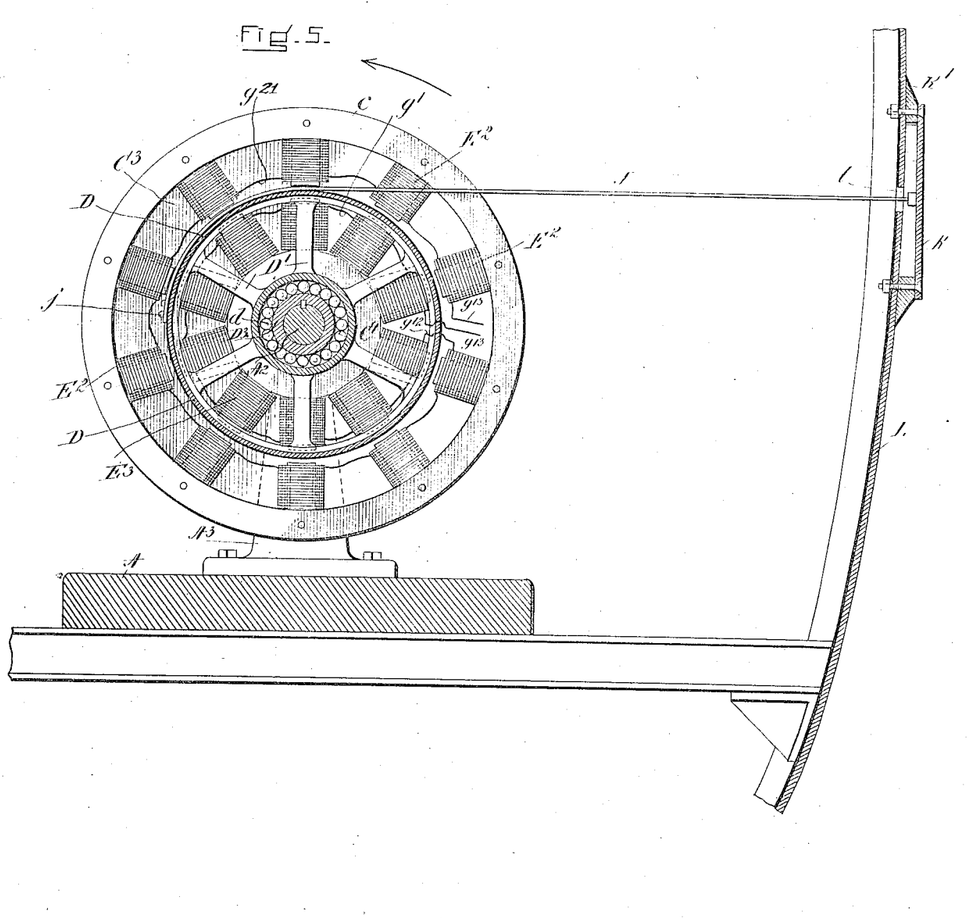
Fig. 5 is a section on the line 5—5 of Fig. 2.

The circuit through the coils E, $E^1$ is not shown, but the circuit through $E^2$, $E^3$ is identical with it and is shown in Figs. 3 and 5 where $g^1$ represents the connection between the inner coils $E^3$ and $g^{21}$, the connection between the outer coils $E^2$, the lead $g^{15}$ connecting the outer coils $E^2$ with the ring $G^{11}$ and the lead $g^{13}$ connecting the inner coils $E^3$ with the ring $G^{10}$. The coils are connected by the wire $g^{12}$. The brushes at each end of the electro-magnets are supported on insulating plates P mounted on standards $P^1$ on the pillars $A^3$.

Figure 1:
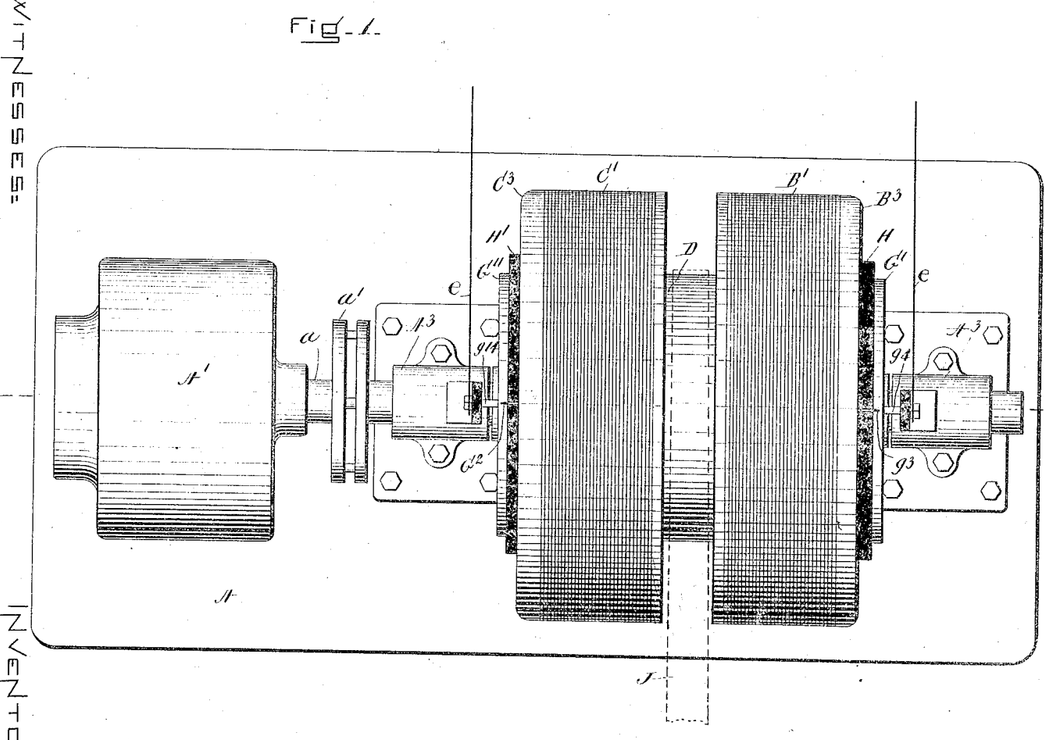
Figure 1 shows a plan of the mechanism embodying our invention.
Figure 2:
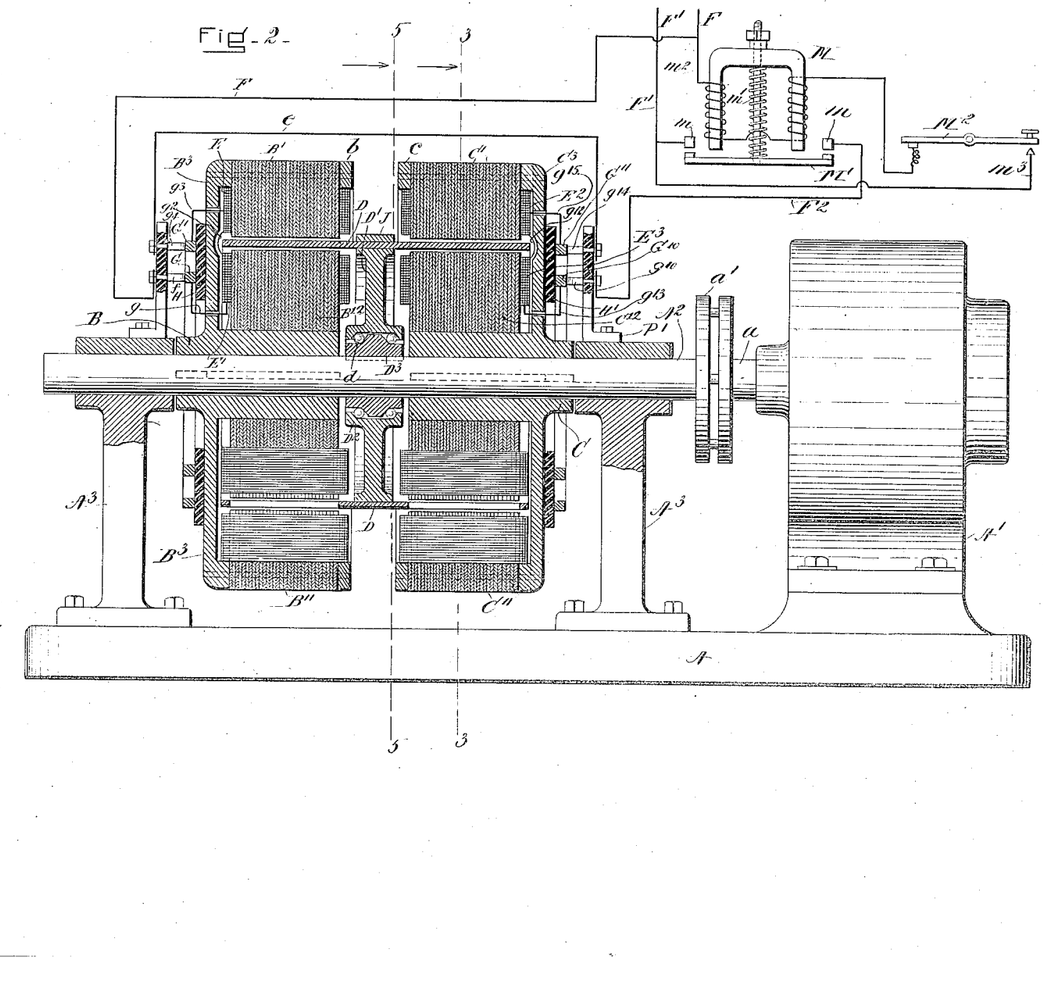
Fig. 2 is a longitudinal section on the line 2—2 of Fig. 1 looking in the direction of the arrow and including also the circuits, the section through the electro-magnet being taken to show the lower coils in elevation.
Figure 6:
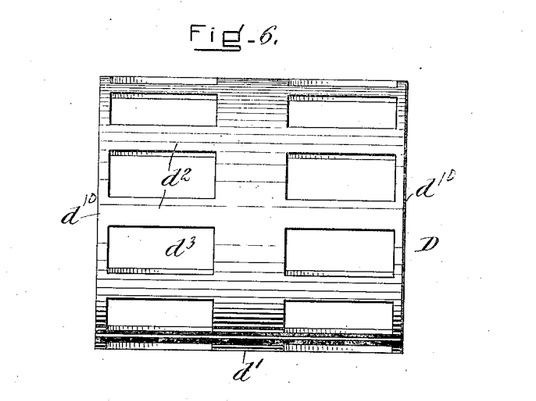
Fig. 6 is an elevation of the secondary or oscillator proper.

The conductor D is shown in elevation in Fig. 6 and in section in Figs. 2, 3 and 5. It is cylindrical in shape and cage like in character comprising two narrow end bands $d^{10}$ and a broad central band $d^1$, these bands being connected together by strips $d^2$ which lie longitudinally of the device and in line with the poles of the magnets. They are separated by openings $d^3$. This conductor, as stated above, is mounted on spokes $D^1$ projecting from the sleeve $D^2$ which is free to turn on the hub $D^3$. In practice this conductor is preferably connected mechanically as by a wire or band J with the object to be vibrated, for example, a diaphragm K as shown in Fig. 5, so that the conductor may be given by the magnetic fields a vibrated movement limited by the excursion of the diaphragm K or other loose member to which it is attached. As shown in Fig. 5 the band is attached to the secondary by bolts $j$ and it may be attached to the diaphragm in any convenient way.

Figure 7:
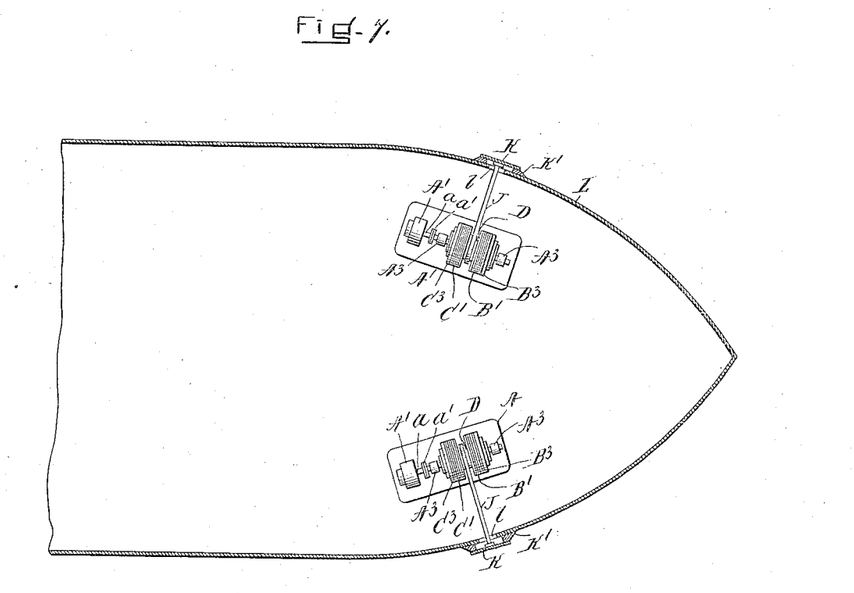
Fig. 7 shows an application of the invention to submarine signaling on shipboard.
Figures 8, 9, 10, 11:
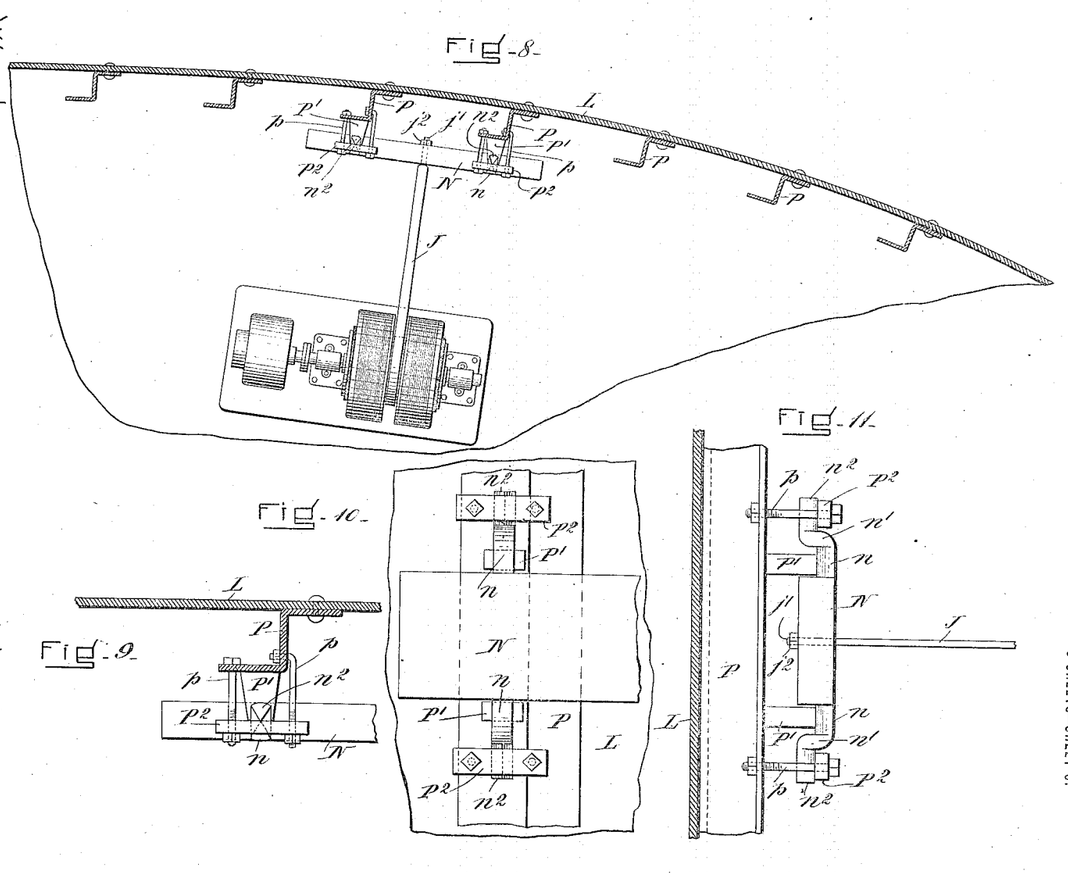
Fig. 8 shows another application of the invention wherein a reed is substituted for a diaphragm.
Figs. 9, 10 and 11 are details thereof.
Figure 12:
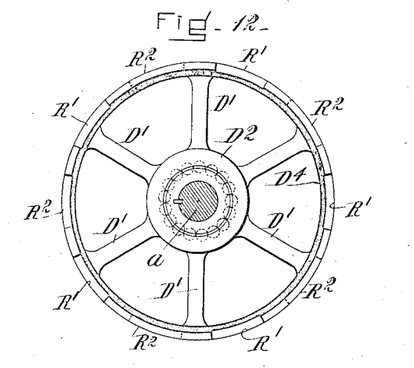
Fig. 12 is an end view of a modified form of the invention.
Figure 13:
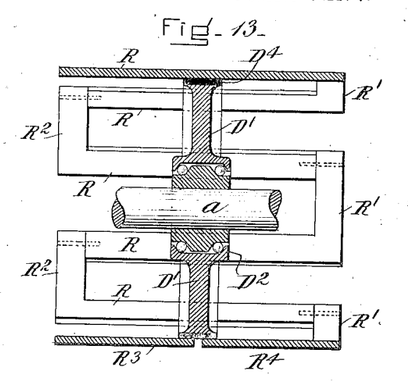
Fig. 13 is a longitudinal section thereof.
Figure 14:
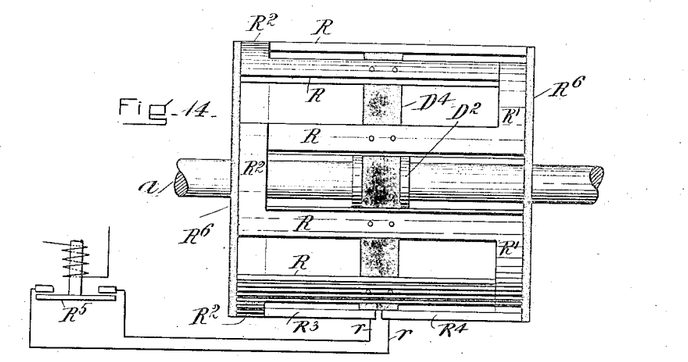
Fig. 14 is a side elevation of this form of conductor showing the conductor circuit.
Figure 15:
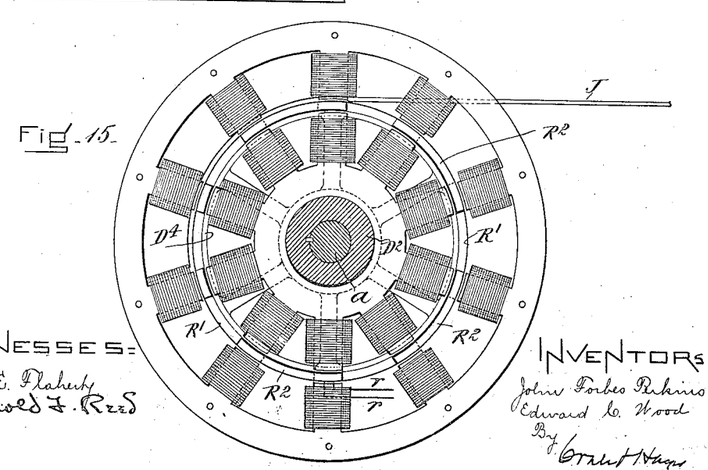
Fig. 15 is an end view showing the conductor in place, the plate $B^3$ and the ring $R^6$ being removed.
Figure 16:
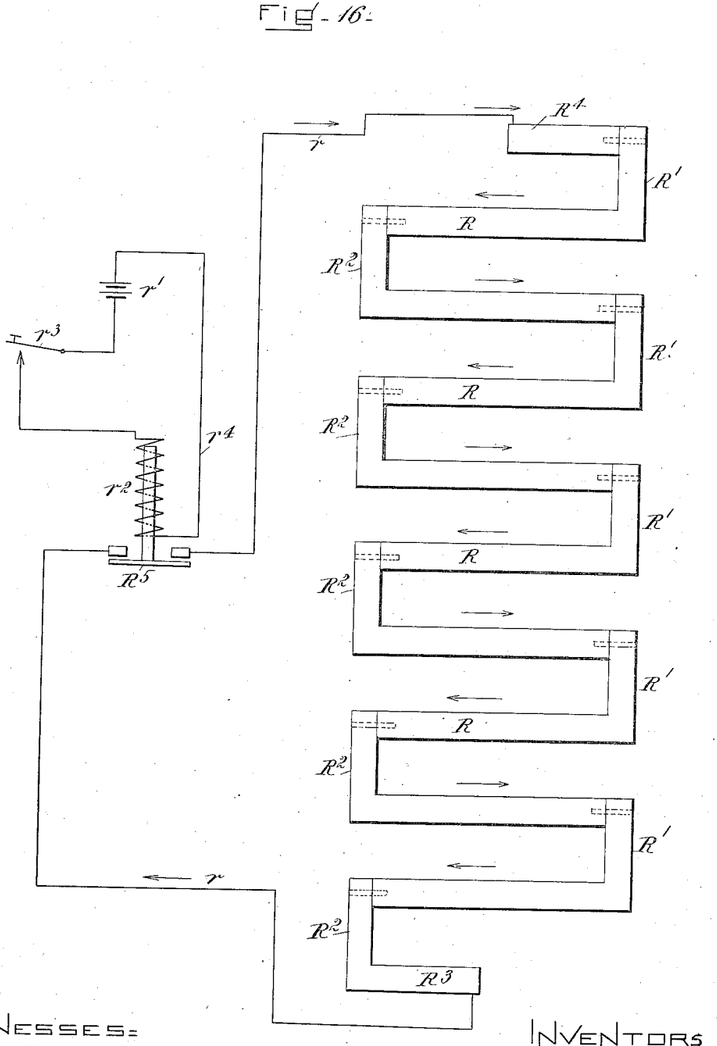
Fig. 16 is a diagrammatic projection showing the circuit.

In Fig. 7 is shown one way of installing the invention as a signaling device. L represents the wall of a ship which is perforated as at $l$ to allow the passage of the band J to the vibrator, in this case the diaphragm K, which is bolted through a ring $K^1$ to the side of the ship making a watertight connection.

As a simple means of closing the circuit through the rotor we have shown a relay M having an armature $M^1$ forming a circuit closer the terminals of which are at $m$. A spring $m^1$ keeps the armature normally out of contact with the relay M. The wire F branches, one portion going to the rotary field as above described and the other portion $m^2$ passing around the relay to the key $M^2$ and then by the wire $m^3$ to the wire $F^1$. Closing the key $M^2$ energizes the electro-magnet M which closes the circuit at its terminals $m$ connecting the wire $F^2$ with the wire $F^1$.

It will be seen that as shown the strips $d^2$ of the conductor are even in number and are equal in number with the pole pieces of the fields. The polarity of the pole pieces as arranged is indicated by the letters N and S. The fields being energized and the rotor being rotated in the direction of the arrow by the motor $A^1$ (Fig. 5), each field will tend to act upon the strip $d^2$ nearest it and pull the conductor against the stress of the vibrator. As that stress increases, however, so that its pull on the conductor becomes greater than that of the passing fields the conductor will gradually be released and tend to return to its normal position. Its strips $d^2$ will meet approaching fields which in passing will carry the conductor along as before. When the openings $d^3$ pass the fields the effect of the fields on the conductor will be at a minimum.

In practice the rotor is rotated by the motor $A^1$ which may be of any convenient type. Direct current being supplied to the circuit F, F¹, etc., the circuit is closed by the key M² and relay M, and the fields are energized causing the oscillating of the conductor and the vibration of the diaphragm. With the opening of the key M² the oscillations cease. The rate of vibration and the consequent pitch of signal will depend upon the speed of the rotor, which may be varied according to the number of vibrations desired. By means of the key any desired code message may be sent as will be easily understood as the vibrations of the diaphragm will only take place when the circuit is closed. Thus the apparatus may be adjusted to deliver any number of vibrations by means of the vibrator and when vibrated on board ship below the water line, communication may be set up, for example, with any number of ships in a fleet, the various ships of which have receiving apparatus tuned to receive signals at different pitches.

Other means of installing the invention as a signaling device is shown in Figs. 8 to 11. In this case instead of perforating the wall of the ship L as at $l$ in Fig. 7 a reed N is attached to the frame P inside the ship and to this reed is attached the strap J by its threaded end $j^1$ and which passes through the center of the reed N and is held by a nut $j^2$.

The reed N is preferably attached to the ship in the following manner: The reed N as shown is somewhat longer than the distance between the two frames P and it is provided near each end with a pair of lugs preferably such as to damp the vibration of the reed as little as possible. These lugs clamp the reed to the frames P in such a way that the vibration of the reed shall be transmitted through the frame to the side of the ship and cause its vibration. We prefer that the lugs should be angular in cross section so that their bearing edges, which are preferably knife edges, shall support the reed at its central plane. Each lug has a part extending laterally from the reed as at $n$, a part at right angles thereto as at $n^1$ and a part $n^2$ extending outwardly from the part $n^1$ and parallel to the part $n$. One surface of the part $n$ is a knife edge; one surface of the part $n^2$ is also a knife edge, these knife edges being substantially in line, the edges being in substantially the central plane of the reed for the best results.

The knife edges of parts $n$ rest on blocks P¹, each supported on one of the frames P and the knife edges of parts $n^2$ rest upon crossbars P², the whole being firmly clamped in place against the frames P by bolts $p$.

The reed should be so proportioned and applied to the frames that their clamps are not at a nodal point in order that a proper amount of vibration may be given the frames and transmitted therefrom to the ship's side.

The strap attachment is at the center of the reed so that it will be set in vibration by the oscillations of the conductor D as in the case where the diaphragm is used.

It will be understood that for clearness the proportions of the parts have been somewhat exaggerated in the figures illustrating this reed. And it will also be understood that other means for supporting and connecting the reed may be used.

Another form of oscillating conductor is shown in Figs. 12 to 16. In this case instead of a solid perforated cage like the conductor D the cage is made up of longitudinal bars R. Each bar is connected at one end by a segment R¹ with the bar R on one side of it and at the other end by a segment R² with the bar R at the other side of it. One bar is preferably divided into two parts R³, R⁴ to form terminals from which leads $r$ run to a circuit closer R⁵ of the general character shown at M in Fig. 2, this circuit closer being operated by a local circuit comprising a battery $r^1$, electro-magnet or solenoid $r^2$, key $r^3$ and conductor $r^4$. These circuits are shown diagrammatically in Fig. 16 where the conductor is also shown diagrammatically in projection.

This conductor is mounted like the conductor D on spokes D¹ projecting from the sleeve D² free to turn on the shaft $a$. In practice the bars R are preferably mounted on an insulated ring D⁴ which is carried by the spokes D¹, this construction keeping the bars in proper relation to each other and properly insulated. In addition we prefer to provide a ring R⁶ of insulating material at each end of the conductor to strengthen it. The band J is connected to this conductor exactly as to the conductor D. The circuit through this modified form of conductor is only closed when the circuit closer R⁵ is closed and at that moment the action of the magnetic flux from the rotary field magnets pulls it vigorously against the stress of the vibrator which as it gradually increases and becomes greater than the pull of the passing fields, returns it to its original position to be acted upon by the next fields. The action in this case is the same as in the case of the conductor D. Signals in this case are given by opening and closing the circuit closer R⁵ by means of the key $r^3$, thus opening the circuit through the conductor.

Our device has other uses, its effectiveness not being limited to submarine work, and the construction of the apparatus may be varied considerably and still embody our invention, the present embodiment being the preferred form, the establishment of the fields in connection with a rotary member or rotor being especially convenient and economical.

While we prefer to make the conductor of copper, those skilled in the art will recognize that other metals are available for the purpose.

Instead of restricting the movement of the conductor by a diaphragm other means may be employed.

What we claim as our invention is:—

1. That method of originating compressional waves in a liquid which consists in causing a stress to be given to a vibratory member in contact with said liquid by establishing a series of magnetic fields and bringing them in turn into influencing relation to a non-magnetic member connected to said vibratory member whereby said non-magnetic member will be intermittently attracted and released to put under stress and release said vibratory member.

2. In a machine of the kind described, a rotary member carrying magnets, a conductor located in the magnetic fields of said magnets and adapted to have a restricted movement, said conductor comprising strips of non-magnetic metal having insulating spaces between them greater in area than the area of the faces of said magnets.

3. In a machine of the kind described, a rotary member carrying magnets, a conductor located in the fields of said magnets to be influenced thereby, said conductor having insulating strips located about its periphery greater in area than its conducting face, and means for limiting the movement of said conductor in its influenced direction.

4. In a machine of the kind described, a rotary member carrying magnets, a conductor mounted concentrically with said rotary member and located in the magnetic fields of said magnets to be influenced thereby, and means for limiting the movement of said conductor in its influenced direction, said means comprising a vibrating element adapted to set up compressional waves.

5. In a machine of the kind described, a vibratory member, a rotary member carrying magnets, an oscillatory member mounted concentrically with said rotary member and in the fields of said magnets to be influenced thereby and connected to said vibratory member whereby the oscillatory movement of said oscillatory member caused by said magnets will cause a vibratory movement of said vibratory member.

6. In a machine of the kind described, a rotary member carrying magnets, a conductor mounted concentrically with said rotary member and located in the magnetic fields of said magnets to be influenced thereby, and means for limiting the movement of said conductor in its influenced direction and for retracting it, said means comprising a vibrating element adapted to set up compressional waves.

7. In a machine of the kind described, a rotary member carrying magnets, a conductor located in the fields of said magnets to be influenced thereby, said conductor comprising conducting strips separated from each other by insulating areas greater than the area of said conducting strips, and means for limiting the movement of said conductor in its influenced direction and for retracting it, said means comprising a vibrator and means for connecting said vibrator to said conductor.

8. In a machine of the kind described, a rotary member carrying magnets, a conductor located in the field of said magnets to be influenced thereby, said conductor comprising conducting strips separated from each other by non-conducting areas greater than the area of said conducting strips, and means for limiting the movement of said conductor in its influenced direction and for retracting it, said means comprising a vibrator and means for connecting said vibrator to said conductor, said vibrator being adapted to send out compressional vibrations.

9. In a machine of the kind described, a rotary member carrying magnets, a conductor mounted concentrically with said rotary member and located in the magnetic fields of said magnets to be influenced thereby, said conductor having alternate strips and openings, said strips being narrower than said openings, and means for limiting the movement of said conductor in its influenced direction and for retracting it, said means comprising a vibrator and means for connecting said vibrator to said conductor.

10. In a machine of the kind described, a rotary member comprising an outer and an inner set of magnets arranged concentrically, a conductor mounted between said outer and inner sets and concentrically therewith, having a capacity for movement independently of said rotary member, said conductor comprising alternate strips and openings, said strips being located to be energized by the fields of said magnets, and the distance between said strips being wider than the faces of said magnets.

11. In a machine of the kind described, a rotor comprising a shaft and two members located to turn therewith, each of said members comprising an outer and an inner set of electro-magnets arranged concentrically about said shaft, and a conductor mounted on said shaft to have a capacity for movement independently of said shaft, said conductor being located between the outer and inner sets of magnets of both members and comprising a series of connected conducting strips and insulating spaces, said conducting strips being located in the path of the fields of said magnets, and means for restricting and retracting the movement of said conductor.

12. As a means for vibrating a vibratory body, a reed, means for attaching it to a vibratory body, said means being located at vibratory points of said reed whereby the vibration of said reed will cause the vibration of said vibratory body, in combination with said vibratory body.

13. As a means for vibrating a vibratory body, a reed, means for attaching it to a vibratory body, said means being located at vibratory points in the central plane of said reed whereby the vibrations of said reed will cause the vibration of said vibratory body, in combination with said vibratory body.

JOHN FORBES PERKINS.
EDWARD C. WOOD.